United States Patent
Kasai et al.

(10) Patent No.: US 11,507,088 B2
(45) Date of Patent: Nov. 22, 2022

(54) SIMULATOR, CONTROL DEVICE, AND NON-TRANSITORY COMPUTER-READABLE RECORDING MEDIUM

(71) Applicant: OMRON Corporation, Kyoto (JP)

(72) Inventors: Kazuki Kasai, Tokyo (JP); Hiromasa Takatsuka, Tokyo (JP); Junichi Wada, Tokyo (JP); Hiroyuki Inoue, Kyoto (JP); Yoshiyuki Tani, Kyoto (JP); Masahiro Ohara, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 224 days.

(21) Appl. No.: 16/610,915

(22) PCT Filed: Jun. 19, 2018

(86) PCT No.: PCT/JP2018/023360
§ 371 (c)(1),
(2) Date: Nov. 5, 2019

(87) PCT Pub. No.: WO2019/026452
PCT Pub. Date: Feb. 7, 2019

(65) Prior Publication Data
US 2020/0159219 A1 May 21, 2020

(30) Foreign Application Priority Data
Aug. 4, 2017 (JP) .............................. JP2017-151839

(51) Int. Cl.
*G05D 1/00* (2006.01)
*G01C 21/34* (2006.01)
(Continued)

(52) U.S. Cl.
CPC ....... *G05D 1/0088* (2013.01); *G01C 21/3469* (2013.01); *G05B 17/02* (2013.01); *G05D 1/0212* (2013.01)

(58) Field of Classification Search
CPC .. G05D 1/0088; G05D 1/0212; G05D 1/0027; G01C 21/3469; G05B 17/02;
(Continued)

(56) References Cited

U.S. PATENT DOCUMENTS 9,387,928 B1 * 7/2016 Gentry ................. G08G 5/0052
2009/0099886 A1   4/2009 Greiner et al.
(Continued)

FOREIGN PATENT DOCUMENTS

JP    H11102295    4/1999
JP    H11161697    6/1999
(Continued)

OTHER PUBLICATIONS

Ma, Hang, and Sven Koenig. "Optimal target assignment and path finding for teams of agents." arXiv preprint arXiv: 1612.05693 (Year: 2016).*

(Continued)

*Primary Examiner* — James J Lee
*Assistant Examiner* — Shon G Foley
(74) *Attorney, Agent, or Firm* — JCIPRNET

(57) ABSTRACT

A feature is realized with which it is possible to determine the work entity by which each load should be transported. A simulator (1) is provided with a transport capacity acquisition portion (6) for acquiring the transport capacity of one or a plurality of types of work entity, a load information acquisition portion (5), a map information acquisition portion (4), a work entity situation acquisition portion (7), and a work entity determination portion (2) for determining a work entity.

15 Claims, 10 Drawing Sheets

| Pattern no. | Load A | Load B | Load C | Required time |
|---|---|---|---|---|
| 1 | Work entity 1 | Work entity 2 | – | |
| 2 | Work entity 1 | – | Work entity 2 | |
| 3 | Work entity 2 | – | – | |
| 4 | Work entity 3 | Work entity 2 | – | |
| 5 | Work entity 3 | – | Work entity 2 | |

| Pattern no. | Load A | Load B | Load C | Required time | |
|---|---|---|---|---|---|
| 1 | Work entity 1 | Work entity 2 | Work entity 2 | 55s | ⇒ Select |
| 2 | Work entity 1 | Work entity 2 | Work entity 2 | 60s | |
| 3 | Work entity 2 | Work entity 2(F) | Work entity 2(S) | 70s | |
| 4 | Work entity 2 | Work entity2(S) | Work entity 2(F) | 75s | |
| 5 | Work entity 3 | Work entity 2 | Work entity 2 | 65s | |
| 6 | Work entity 3 | Work entity 2 | Work entity 2 | 60s | |

(51) Int. Cl.
*G05B 17/02* (2006.01)
*G05D 1/02* (2020.01)

(58) Field of Classification Search
CPC .. G06Q 10/0631; G06Q 10/047; G06Q 10/08; G06Q 50/28; G06Q 10/0832; G06Q 10/083; G06Q 50/30; B65G 1/137; B64C 39/024; B64C 2201/128; G08G 5/0069; G08G 1/202
See application file for complete search history.

(56) References Cited

U.S. PATENT DOCUMENTS

| | | | |
|---|---|---|---|
| 2016/0129592 A1 | 5/2016 | Saboo et al. | |
| 2017/0059336 A1 | 3/2017 | Huang et al. | |
| 2017/0123421 A1 | 5/2017 | Kentley et al. | |
| 2018/0158016 A1* | 6/2018 | Pandya | B65G 1/0492 |
| 2018/0238698 A1* | 8/2018 | Pedersen | G01C 21/3469 |

FOREIGN PATENT DOCUMENTS

| | | |
|---|---|---|
| JP | 2001240219 | 9/2001 |
| JP | 2002160815 | 6/2002 |
| JP | 2005084848 | 3/2005 |
| JP | 2007069997 | 3/2007 |
| JP | 2009080804 | 4/2009 |
| JP | 2010092321 | 4/2010 |
| JP | 2011516881 | 5/2011 |
| JP | 2013086915 | 5/2013 |
| JP | 2014029622 | 2/2014 |
| KR | 20060076441 | 7/2006 |
| KR | 20170013973 | 2/2017 |
| KR | 20170085536 | 7/2017 |
| WO | 2015059739 | 4/2015 |
| WO | 2015185628 | 12/2015 |
| WO | 2016087535 | 6/2016 |
| WO | 2016132295 | 8/2016 |
| WO | 2017068871 | 4/2017 |
| WO | 2017115447 | 7/2017 |

OTHER PUBLICATIONS

"Office Action of Japan Counterpart Application", dated Apr. 27, 2021, with English translation thereof, p. 1-p. 7.

"International Search Report (Form PCT/ISA/210) of PCT/JP2018/023360," dated Sep. 25, 2018, with English translation thereof, pp. 1-5.

"Written Opinion of the International Searching Authority (Form PCT/ISA/237) of PCT/JP2018/023360," dated Sep. 25, 2018, with English translation thereof, pp. 1-8.

"Office Action of Taiwan Counterpart Application", dated Jun. 27, 2019, p. 1-p. 14.

"Search Report of Europe Counterpart Application", dated Jan. 21, 2021, p. 1-p. 9.

"Office Action of Korea Counterpart Application", dated Jan. 6, 2021, with English translation thereof, p. 1-p. 11.

"Office Action of Korea Counterpart Application" with English translation thereof, dated Jul. 6, 2021, p. 1-p. 13.

"Office Action of Japan Counterpart Application" with English translation thereof, dated Sep. 7, 2021, p. 1-p. 7.

* cited by examiner

| Pattern no. | Load A | Load B | Load C | Required time |
|---|---|---|---|---|
| 1 | Work entity 1 | Work entity 2 | Work entity 3 | 80s |
| 2 | Work entity 1 | Work entity 3 | Work entity 2 | 75s |
| 3 | Work entity 2 | Work entity 1 | Work entity 3 | 60s |
| 4 | Work entity 2 | Work entity 3 | Work entity 2 | 65s |
| 5 | Work entity 3 | Work entity 1 | Work entity 2 | 70s |
| 6 | Work entity 3 | Work entity 2 | Work entity 1 | 70s |

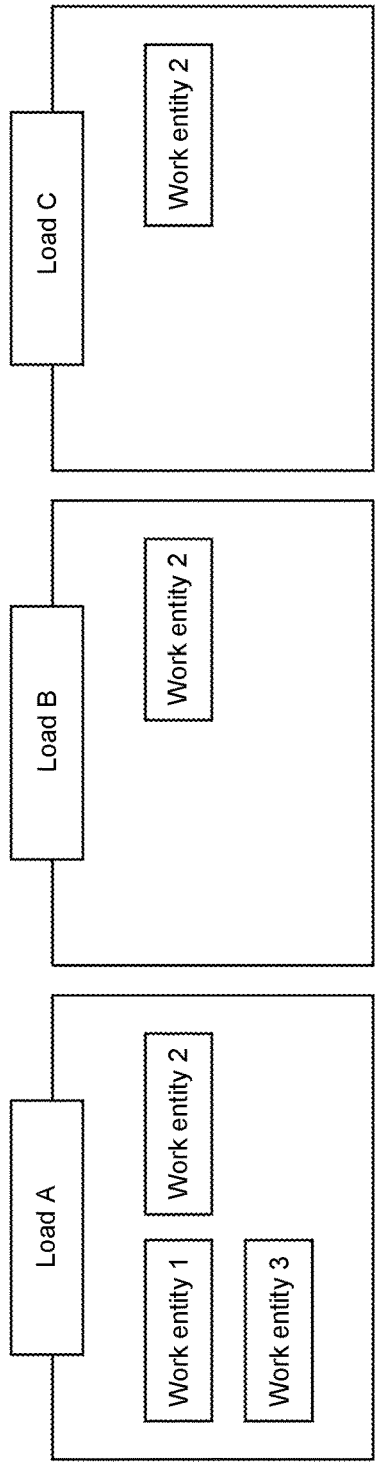

| Load | Start position | Goal position |
|---|---|---|
| Load A | $P_{SA}$ | $P_{GA}$ |
| Load B | $P_{SB}$ | $P_{GB}$ |
| Load C | $P_{SC}$ | $P_{GC}$ |

31

| Charging station | Position |
|---|---|
| Charging station A | $P_{StA}$ |
| Charging station B | $P_{StB}$ |
| Charging station C | $P_{StC}$ |

| Work entity | Usable or not | Usable time | Usable position | |
|---|---|---|---|---|
| Work entity 1 | Unusable | After 20 s | $P_{GA}$ | |
| Work entity 2 | Unusable | After 30 s | $P_{GB}$ | ⇨ Select |
| Work entity 3 | Usable | After 0 s | $P_{StC}$ | |

FIG. 5B

| Pattern no. | Combination no. | Load A | Load B | Load C | Required time |
|---|---|---|---|---|---|
| 1 | 1 | Work entity 1 | Work entity 1 | Work entity 1 | 60s |
| 2 | 2 | Work entity 1 | Work entity 1 | Work entity 1 | 60s |
| 3 | 2 | Work entity 1 | Work entity 1 | Work entity 2 | 55s → Select |
| 4 | 2 | Work entity 1 | Work entity 1 | Work entity 3 | 70s |
| 5 | 3 | Work entity 1 | Work entity 1 | Work entity 1 | 60s |
| 6 | 3 | Work entity 2 | Work entity 1 | Work entity 2 | 75s |
| 7 | 4 | Work entity 1 | Work entity 1 | Work entity 1 | 65s |
| 8 | 4 | Work entity 2 | Work entity 1 | Work entity 1 | 70s |

FIG. 7

SIMULATOR, CONTROL DEVICE, AND NON-TRANSITORY COMPUTER-READABLE RECORDING MEDIUM

CROSS-REFERENCE TO RELATED APPLICATION

This application is a 371 application of the International PCT application serial no. PCT/JP2018/023360, filed on Jun. 19, 2018, which claims the priority benefits of Japan Patent Application No. 2017-151839, filed on Aug. 4, 2017. The entirety of the above-mentioned patent application is hereby incorporated by reference herein and made a part of this specification.

BACKGROUND

Technical Field

The disclosure relates to a simulator, a control device, and a simulation program.

Background Art

In the related art, technologies for transporting loads in warehouses were known. Patent Literature 1 discloses a technology of sorting sorted goods using a robot. Patent Literature 2 discloses a technology for allocating charging work to unmanned transport trucks that transport articles manufactured in a production line. Patent Literature 3 discloses a technology for planning movement sections of a plurality of movement robots.

CITATION LIST

Patent Literature

[Patent Literature 1]
Japanese Patent Laid-Open No. 2013-86915 (disclosed on May 13, 2013)
[Patent Literature 2]
Japanese Patent Laid-Open No. 2010-92321 (disclosed on Apr. 22, 2010)
[Patent Literature 3]
Japanese Patent Laid-Open No. 2009-80804 (disclosed on Apr. 16, 2009)

SUMMARY

Technical Problem

In transport in a load sorting space such as a warehouse, single kinds of robots (work entities) in which conditions of transportable loads are mutually the same are used normally. On the other hand, the inventors and the like of the present specification have found the knowledge that a configuration including a plurality of kinds of robots and people for which conditions of transportable loads are mutually different can realize efficient transport.

As described above, however, a method of finding out which kinds of robots and/or people transport each load efficiently in the configuration including pluralities of kinds of robots and people as work entities has not be known.

An aspect of the disclosure provides a technology for determining which work entities transport each load.

Solution to Problem

To solve the foregoing problem, according to an aspect of the disclosure, a simulator includes: a transport capacity acquisition portion configured to acquire a transport capacity of one kind of work entity or a plurality of kinds of work entities including a condition of a load which the work entity is able to transport; a load information acquisition portion configured to acquire load information regarding each load; a map information acquisition portion configured to acquire map information; a work entity situation acquisition portion configured to acquire a work entity situation including positional information of each work entity; and a work entity determination portion configured to determine the work entity transporting each load with reference to the transport capacity, the load information, the map information, and the work entity situation.

To solve the foregoing problem, according to another aspect of the disclosure, a control device includes: a transport capacity acquisition portion configured to acquire a transport capacity of one kind of work entity or a plurality of kinds of work entities including a condition of a load which the work entity is able to transport; a load information acquisition portion configured to acquire load information regarding each load; a map information acquisition portion configured to acquire map information; a work entity situation acquisition portion configured to acquire a work entity situation including positional information of the one kind of work entity or the plurality of kinds of work entities; a work entity determination portion configured to determine the work entity transporting each load with reference to the transport capacity, the load information, the map information, and the work entity situation; and a control portion configured to control the work entity with reference to a determination result regarding the work entity.

Advantageous Effects of Invention

An aspect of the disclosure, it is possible to realize a technology for determining which work entities transport each load.

BRIEF DESCRIPTION OF DRAWINGS

FIGS. 4A and 4B are diagrams illustrating transport pattern calculation example 2 according to the first embodiment of the disclosure.

FIGS. 5A and 5B are diagrams illustrating transport pattern calculation example 2 according to the first embodiment of the disclosure.

FIG. 7 is a diagram illustrating transport pattern calculation example 3 according to the first embodiment of the disclosure.

DESCRIPTION OF EMBODIMENTS

Figure 1:
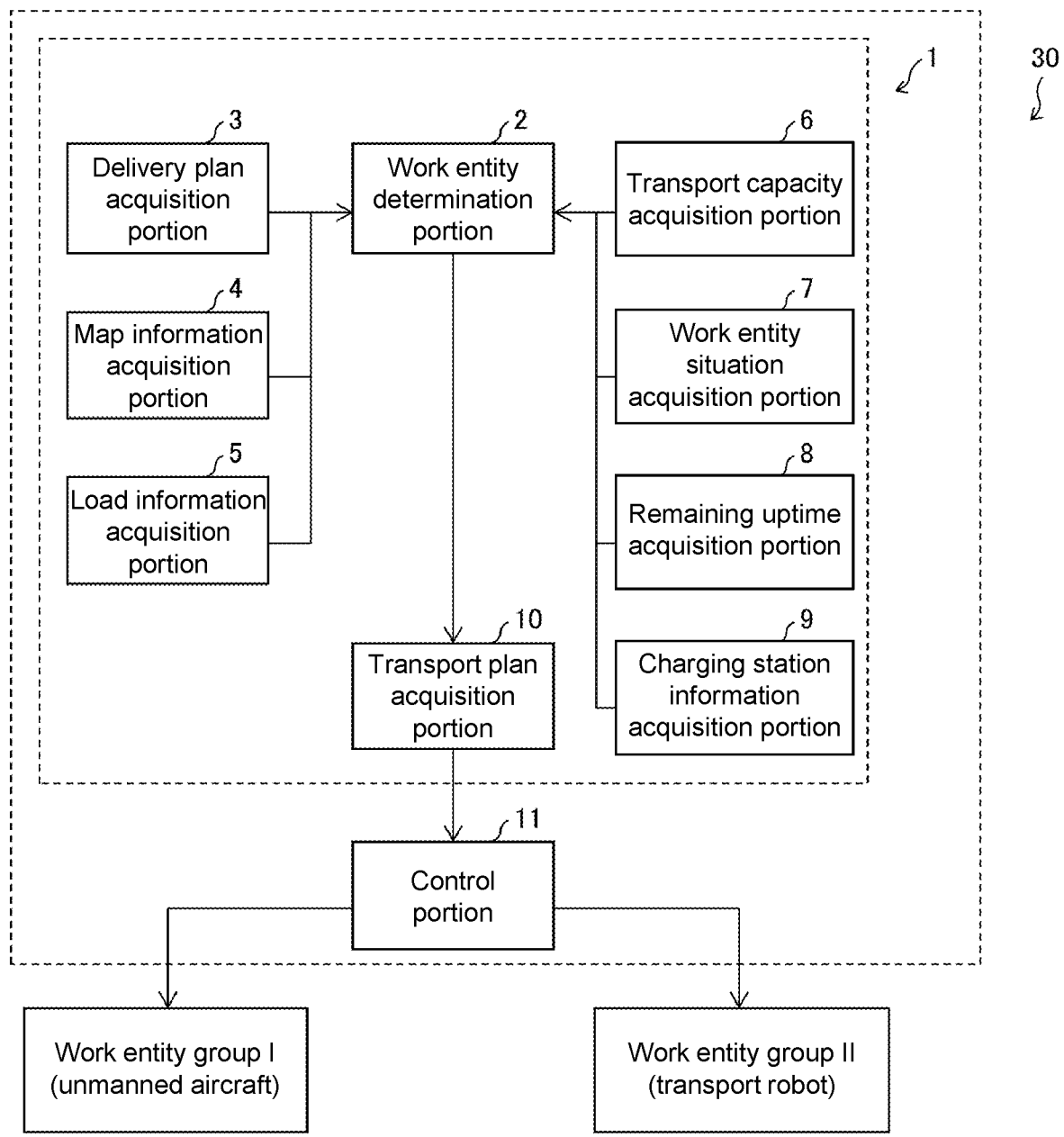
FIG. 1 is a block diagram illustrating an overall configuration of a simulator according to a first embodiment of the disclosure.

Hereinafter, embodiments of the disclosure will be described in detail with reference to the drawings. Here, configurations described in the embodiments do not limit the scope of the disclosure unless otherwise stated, and are merely simple description examples. To facilitate the description, the same reference numerals are given to members that have the same functions as those of members according to each embodiment and description thereof will be appropriately omitted.

In the present specification, the concept of "work entities" includes moving bodies such as robots, people (workers), and the like. The concept of "work entities" differs from that of "users" using a simulator or the like. "Moving bodies" is assumed not to include people.

First Embodiment (Configurations of Simulator 1 and Control Device 30)

Configurations of the simulator 1 and the control device 30 will be described with reference to FIG. 1. FIG. 1 is a block diagram illustrating the configurations of the simulator 1 and the control device 30. As illustrated in FIG. 1, the simulator 1 includes a work entity determination portion 2, a delivery plan acquisition portion 3, a map information acquisition portion 4, a load information acquisition portion 5, a transport capacity acquisition portion 6, a work entity situation acquisition portion 7, a remaining uptime acquisition portion 8, a charging station information acquisition portion 9, and a transport plan acquisition portion 10. The control device 30 includes the simulator 1 and a control portion 11.

In the embodiment, for example, the delivery plan acquisition portion 3 acquires a delivery plan related to transport of loads in a warehouse and supplies the delivery plan to the work entity determination portion 2. In the embodiment, the "delivery plan" also includes a plan decided in advance in relation to transport of loads in a warehouse. Here, the plan decided in advance in relation to transport of loads includes a plan related to a transport amount of loads and delivery times. For example, the plan related to transport of loads in the warehouse includes a plan regarding a time by which a certain load is transported.

In the embodiment, the map information acquisition portion 4 acquires map information in the warehouse and supplies the map information to the work entity determination portion 2. The map information is not limited to map information regarding one warehouse and can be, for example, map information regarding a plurality of warehouses installed in a site. In this way, an embodiment in which a work entity transports a load by reciprocating between a plurality of warehouses in a site is included in the embodiments disclosed in the present specification.

The load information acquisition portion 5 acquires load information regarding each load which is a transport target. The load information is a condition of a load necessary to determine a work entity transporting each load. Load information regarding transport of a load includes, for example, information regarding the weight, size, and shape of each load, a property of a load such as a center of gravity of the load, the position of each load in a warehouse, and a transport destination of each load in a warehouse. The load information acquisition portion 5 can acquire, for example, not only a 2-dimensional position of each load in a warehouse but also a 3-dimensional disposition of each load in the warehouse, such as on what level of a shelf a load is located, as the position of each load in the warehouse.

The transport capacity acquisition portion 6 acquires information which includes a condition of a load which can be transported by one kind of work entity or a plurality of kinds of work entities and is information indicating a transport capacity of the work entity and supplies information indicating the transport capacity to the work entity determination portion 2. The transport capacity acquisition portion 6 acquires a condition of a load which can be transported by a work entity for each kind of work entity. In the embodiment, the "kind" of work entity indicates that a certain capacity related to transport is different among capacities of the work entity. For example, a plurality of kinds of work entities can be work entities of which maximum loading amounts are mutually different. In addition, the kind of work entity can be information referred to when the work entity determination portion 2 determines a kind of load to be transported.

The transport capacity acquisition portion 6 may be configured to acquire, for example, information such as a movement speed of each kind of work entity, power consumption, and a longest distance the work entity can move without being charged in addition to the weight of the load which can be transported by each kind of work entity, as the information indicating the transport capacity of the work entity. In a mode in which each work entity can simultaneously transport a plurality of loads, the transport capacity acquisition portion 6 may acquire information regarding loads which can be simultaneously transported by each work entity.

The transport capacity acquisition portion 6 preferably acquires information including an item corresponding to an item included in the above-described load information as the information indicating the transport capacity of the work entity. For example, when the load information acquisition portion 5 acquires information regarding the weight or shape of a load as the load information, the transport capacity acquisition portion 6 preferably acquires the information regarding the weight or shape of the load which can be transported by the work entity as the information indicating the transport capacity of the work entity.

In the embodiment, as will be described below, one kind of work entity or a plurality of kinds of work entities can include a flight body such as one kind of unmanned aircraft or a plurality of kinds of unmanned aircrafts. Hereinafter, work entities are assumed to be moving bodies such as robots, but an embodiment in which the work entities include people (workers) is within the scope of the present specification. In this case, "kinds" of people can be, for example, kinds of people based on a difference between transport capacities of people. For example, the transport capacity acquisition portion 6 may group people by each transport capacity and set kinds of people. When the work entities are people, charging is not necessary, of course. However, the simulator 1 can consider break times of people or the like instead.

In general, in an aircraft such as an unmanned aircraft, it is more difficult to impose a restriction on weight of a load which can be transported than an automatic transport robot. Therefore, when a work entity includes a flight body such as an unmanned aircraft, it is particularly important for the foregoing load information acquisition portion 5 to acquire information regarding weight of loads and it is particularly important for the transport capacity acquisition portion 6 to acquire the weights of loads which can be transported by one kind of work entity or a plurality of kinds of work entities.

The work entity situation acquisition portion 7 acquires a work entity situation at a certain time point including positional information at a time point of each work entity and supplies the work entity situation to the work entity determination portion 2. The positional information regarding the work entity can be not only a 2-dimensional position in a warehouse but also 3-dimensional position including information regarding a height at which the work entity is located. For example, when a work entity includes a flight body such as an unmanned aircraft and the unmanned aircraft or the like is flying in a warehouse, the work entity situation acquisition portion 7 can be configured to acquire positional information including a height at which the unmanned aircraft or the like is flying. When the unmanned aircraft or the like waits on a shelf or the like, the work entity situation acquisition portion 7 acquires a waiting position of the unmanned aircraft or the like as positional information.

The work entity situation acquisition portion 7 can also acquire information regarding use or non-use of each work entity at a certain time point and a time at which each work entity can be used in addition to the positional information of each work entity. By acquiring such information, the work entity determination portion 2 can generate a more efficient transport plan. The use or non-use of each work entity at a certain time point is determined in accordance with, for example, whether the work entity transports a load at the certain time point, whether the work entity is being charged at the certain time point, or whether the work entity is broken at the certain time point. A time at which each work entity can be used can be, for example, a time at which transport of a load by the work entity ends or a time at which charging of a work entity finishes.

The remaining uptime acquisition portion 8 acquires a remaining uptime of each work entity and supplies the remaining uptime to the work entity determination portion 2. When the remaining uptime acquisition portion 8 acquires the remaining uptime of each work entity, the work entity determination portion 2 can generate a charging plan of the work entity. Thus, a user can charge each work entity at an appropriate timing. Since the work entity determination portion 2 can generate an efficient charging plan of the work entity, a control device in which frequent charging is necessary, such as an unmanned aircraft, can be utilized more appropriately as a work entity.

The charging station information acquisition portion 9 acquires charging station information regarding whether to charge the moving body at a certain time point and supplies the charging station information to the work entity determination portion 2. The charging station information includes, for example, information regarding the number of chargers which are unoccupied at a certain time point, the number of work entities which can be charged at a certain time point, and a power capacity which can be supplied by each charging station. The charging station information may include information indicating the position of the charging station. Since the charging station information acquisition portion 9 acquires the charging station information, the work entity determination portion 2 can generate a more efficient charging plan.

The work entity determination portion 2 determines a work entity that transports each load with reference to the delivery plan acquired by the delivery plan acquisition portion 3, the map information acquired by the map information acquisition portion 4, the load information acquired by the load information acquisition portion 5, the transport capacity of each work entity acquired by the transport capacity acquisition portion 6, control target information acquired by a control target information acquisition portion 12, the work entity situation acquired by the work entity situation acquisition portion 7, the remaining uptime of each work entity acquired by the remaining uptime acquisition portion 8, and the charging station information acquired by the charging station information acquisition portion 9. The work entity determination portion 2 generates a transport plan with reference to a determination result regarding a load transported by each work entity (in the present specification, also referred to as a "determination result regarding the work entity"). The work entity determination portion 2 supplies the generated transport plan to the transport plan acquisition portion 10. The configuration of the work entity determination portion 2 and the details of generation of the transport plan will be described below with reference to FIG. 2.

The transport plan acquisition portion 10 acquires the transport plan from the work entity determination portion 2. The transport plan acquisition portion 10 supplies the transport plan to the control portion 11. In the embodiment, the control portion 11 controls, for example, two kinds of work entity groups with different transport capacities. Work entity group I includes a plurality of unmanned aircrafts (drones) and work entity group II includes a plurality of automatic transport robots. In the embodiment, the work entity group is a group in which the same kinds of work entities are collected. The number of work entity groups and the number of work entities in each work entity group are not particularly limited.

In the embodiment, when work entity group I includes unmanned aircrafts, the work entity determination portion 2 can generate a more efficient transport plan. In general, an unmanned aircraft can move at a faster speed than an automatic transport robot and can transport a load along diverse transport routes without being obstructed by obstacles on the ground compared to an automatic transport robot. An unmanned aircraft is suitable for transporting a load located on a high shelf. Further, an unmanned aircraft can easily be disposed so that movement of a transport robot moving on the ground is not disturbed. In this way, in the present embodiment, since the control portion 11 controls a work entity including an unmanned aircraft, the work entity determination portion 2 can generate a more efficient transport plan.

Since the work entities include a plurality of kinds of work entities with different transport capacities, the work entity determination portion 2 can determine a load transported by each work entity in accordance with the transport capacity of each kind of work entity and can generate a more efficient transport plan.

(Work Entity Determination Portion 2)

Figure 2:
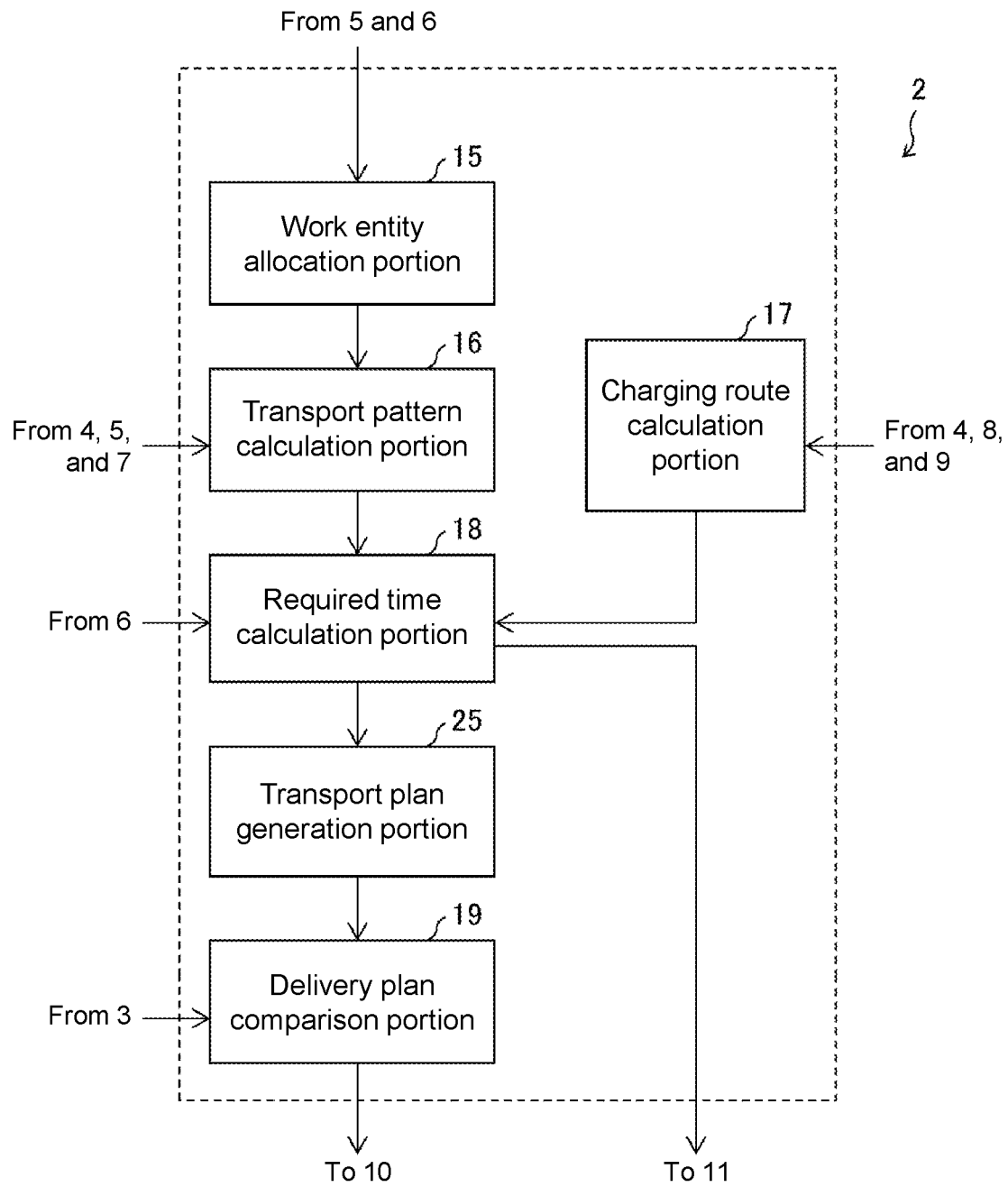
FIG. 2 is a block diagram illustrating an overall configuration of a work entity determination portion according to the first embodiment of the disclosure.

A configuration of the work entity determination portion 2 will be described with reference to FIG. 2. FIG. 2 is a block diagram illustrating an overall configuration of the work entity determination portion 2. The work entity determination portion 2 includes a work entity allocation portion 15, a transport pattern calculation portion 16, a charging route calculation portion 17, a required time calculation portion 18, and a delivery plan comparison portion 19.

First, the work entity allocation portion 15 allocates all the work entities that have the transport capacities capable of transporting loads to the loads with reference to the load information supplied from the load information acquisition portion 5 and the transport capacity supplied from the transport capacity acquisition portion 6. The work entity allocation portion 15 determines whether there are loads to which the work entities are not allocated. When there are loads to which the work entities are not allocated, an error is supplied to a display portion (not illustrated) of the control device 30 and the display portion displays the error. When the work entities can be allocated to all the loads, the work entity allocation portion 15 supplies an allocation result to the transport pattern calculation portion 16.

The transport pattern calculation portion 16 calculates a plurality of patterns which are combinations of the loads and the work entities transporting the loads as transport patterns with reference to the work entity situation supplied from the work entity situation acquisition portion 7 and the allocation result supplied from the work entity allocation portion 15. The details of a method of calculating the transport patterns will be described later. The transport pattern calculation portion 16 calculates a transport route for each transport pattern with reference to map information supplied from the map information acquisition portion 4, positional information of the work entity supplied from the load information acquisition portion 5, positional information of a load, and a transport destination of the load. The transport pattern calculation portion 16 supplies the calculated transport patterns and transport route to the required time calculation portion 18 and the charging route calculation portion 17.

The charging route calculation portion 17 determines whether it is necessary to charge each work entity with reference to the remaining uptime supplied from the remaining uptime acquisition portion 8. A method in which the charging route calculation portion 17 determines whether it is necessary to charge each work entity is not particularly limited. For example, when the remaining uptime of a certain work entity is equal to or less than a constant value, the charging route calculation portion 17 determines that it is necessary to charge the work entity. A user can appropriately set the "constant value." The charging route calculation portion 17 may determine the constant value in consideration of the remaining uptime necessary to move the work entity to the position of an unoccupied charging station.

When it is necessary to charge the work entity, the charging route calculation portion 17 calculates a route along which each work entity is moved to the charging station, that is, a charging route, for each work entity with reference to the map information supplied from the map information acquisition portion 4. The charging route calculation portion 17 supplies the calculated charging route to the required time calculation portion 18.

For example, the charging route calculation portion 17 calculates a plurality of charging routes. The required time calculation portion 18 can perform more efficient charging by determining a charging route in which a required time for charging is the shortest with reference to the plurality of charging routes supplied from the charging route calculation portion 17 and supplying the charging route to the control portion 11. Although not illustrated in FIG. 2, the charging route calculation portion 17 may calculate only one charging route and supply the charging route to the control portion 11 without supplying the charging route to the required time calculation portion 18.

The required time calculation portion 18 calculates a required time of load transport in each transport pattern with reference to the transport patterns supplied from the transport pattern calculation portion 16, the transport route in each transport pattern, and a movement speed of each work entity supplied from the transport capacity acquisition portion 6. Based on the calculated required time, the required time calculation portion 18 determines a transport pattern in which the required time is the shortest. The determined transport pattern includes a determination result regarding each work entity. The required time calculation portion 18 supplies the determined transport pattern in which the required time is the shortest to the transport plan generation portion 25.

The transport plan generation portion 25 generates the transport plan with reference to the transport pattern in which the required time is the shortest and which is calculated by required time calculation portion 18. The transport plan generation portion 25 supplies the calculated transport plan to the delivery plan comparison portion 19. The delivery plan comparison portion 19 compares the transport plan supplied from the transport plan generation portion 25 with the delivery plan supplied from the delivery plan acquisition portion 3 and determines whether the transport plan is able to achieve the delivery plan. When the delivery plan comparison portion 19 determines that the transport plan is able to achieve the delivery plan, the transport plan is supplied to the transport plan acquisition portion 10. Conversely, when the delivery plan comparison portion 19 determines that the transport plan is not able to achieve the delivery plan, an error is supplied to the display portion of the control device 30 and the display portion displays the error.

The transport plan generation portion 25 may acquire the charging route from the charging route calculation portion 17 and generate the transport plan in consideration of a time at which charging of each work entity is completed. Thus, the transport plan generation portion 25 can generate the more efficient transport plan and charging plan.

In the embodiment, the work entity determination portion 2 determines the work entities so that the required time related to load transport is the shortest and the total amount spent for the work entities is small, but a user can freely set an optimum number of work entities under a certain condition when the user determines the number of work entities. For example, the user can set the work entities transporting each load so that the work entity determination portion 2 satisfies a predetermined condition, in other words, a certain item is within the range of a condition set by the user. Here, the predetermined condition is not particularly limited and can be, for example, a condition of energy consumption or the like in addition to the above-described required time and the total amount spent for the work entities.

Transport Pattern Calculation Example 1

Figures 3A, 3B:
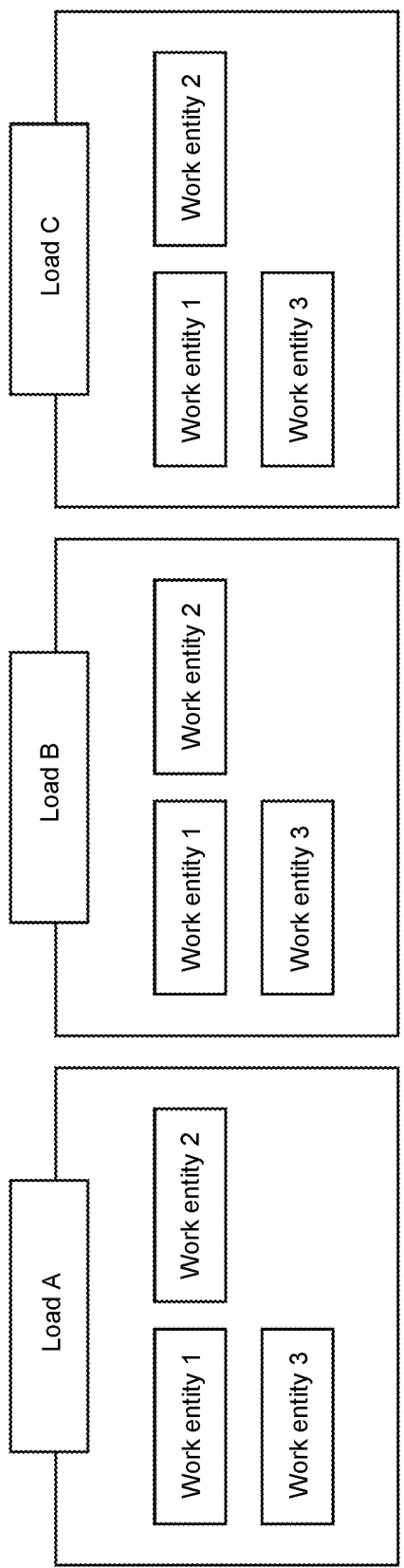
FIGS. 3A and 3B are diagrams illustrating transport pattern calculation example 1 according to the first embodiment of the disclosure.

Transport pattern calculation example 1 will be described with reference to FIGS. 3A and 3B. FIG. 3A is a diagram illustrating a method of allocating the work entity to each load. FIG. 3B is a table illustrating a required time in each transport pattern.

As illustrated in FIG. 3A, the work entity allocation portion 15 first allocates all the work entities capable of transporting each load with reference to the load information regarding each load and the transport capacity of each work entity. In this example, work entities 1 to 3 are all allocated to each of loads A to C. The work entity allocation portion 15 supplies a calculated allocation result to the transport pattern calculation portion 16.

As illustrated in FIG. 3B, subsequently, the transport pattern calculation portion 16 calculates combinations of the loads and the work entities as a plurality of patterns. The transport pattern calculation portion 16 calculates a transport route for each combination and sets a combination of the transport entity and the transport route for each load as a transport pattern. The transport pattern calculation portion 16 supplies the calculated transport pattern to the required time calculation portion 18. The required time calculation portion 18 selects the transport pattern in which the required time is the shortest among the plurality of transport patterns. In this example, the required time calculation portion 18 selects transport pattern 3 in which the required time is the shortest as the transport pattern.

In this example, the required time calculation portion 18 examines the required time exhaustively on all the transport patterns indicating each combination of each load and the work entities. However, when the number of transport patterns is large, the required time calculation portion 18 may narrow down the transport pattern and calculate the required time.

Transport Pattern Calculation Example 2

Transport pattern calculation example 2 in each introduction number pattern will be described with reference to FIGS. 4A, 4B, 5A and 5B.

FIG. 4A is a diagram illustrating a method of allocating the work entity to each load. FIG. 4B is a table illustrating a required time in each transport pattern. FIG. 5A is a diagram illustrating load information regarding each load and charging station information. FIG. 5B is a diagram illustrating a work entity situation of each work entity at the time of starting of first transport.

As illustrated in FIG. 4A, in this example, unlike example 1 described above, work entities 1 to 3 are allocated as work entities capable of transporting load A, only work entity 2 is allocated as a work entity capable of transporting load B, and only work entity 2 is allocated as a work entity capable of transporting load C.

As shown in Table 20 of FIG. 4B, in this example, unlike example 1 described above, the work entity allocation portion 15 may not transport all the loads by merely allocating each work entity to each load once. Accordingly, in this example, after the work entity allocation portion 15 allocates the work entities once, as will be described later, the work entities are allocated again with reference to an ending time and a position of the first transport of each work entity.

Table 21 of FIG. 4B shows transport patterns which are calculated by the work entity allocation portion 15 and include twice allocation results of the work entities. Table 20 shows first allocation. The transport pattern calculation portion 16 allocates the work entities in Table 20 to unallocated loads second time to obtain transport patterns shown in Table 21.

The number of times the transport pattern calculation portion 16 allocates the work entities is not particularly limited. The transport pattern calculation portion 16 can allocate the work entities until loads to which the work entities are allocated do not exist and can calculate the transport patterns including allocation results of a plurality of times.

For transport patterns 1, 2, 4, and 5 in Table 20, the transport patterns obtained by the work entity allocation portion 15 allocating the work entities second time are transport patterns 1, 2, 5, and 6. For transport pattern 3 in Table 20, transport patterns obtained by the work entities allocation portion 15 allocating the work entities second and third times are transport patterns 3 and 4. In transport pattern 3, work entity 2 first transports load A, subsequently transports load B, and then transports load C. In transport pattern 4, work entity 2 first transports load A, subsequently transports load C, and then transports load B.

In the transport patterns shown in Table 21, each work entity first transports the load in the allocation of Table 20 and subsequently transports the load allocated in Table 21. In Table 21, (F) means a load which the work entity first transports and (S) means a load which the work entity subsequently transports.

The required time calculation portion 18 calculates a required time of each transport pattern and selects transport pattern 1 in which the required time is the shortest.

Calculation of the transport route of second transport in transport pattern 1 will be described in detail with reference to FIGS. 5A and 5B. As described above with reference to Table 20 of FIG. 4B, load C may not be transported only in the first allocation. Accordingly, the work entity allocation portion 15 determines the work entities which transports load C by performing the second allocation. As illustrated in FIGS. 4A and 4B, since only work entity 2 has the transport capacity capable of transporting load C, work entity 2 can be allocated to load C in the second allocation.

Start positions and goal positions of loads A to C are each shown in Table 31 of FIG. 5A. The positions of the charging stations A to C are shown in Table 32 of FIG. 5A.

The transport pattern calculation portion 16 calculates a transport route of the second transport with reference to the ending time and the position of the first transport. In the first transport, since work entity 2 transports load B, work entity 2 is located at a goal position PGB of load B at the time of ending of the first transport.

As illustrated in FIG. 5B, work entities 1 and 2 used for the first transport are unusable at the time of starting of the first transport. Work entity 2 can be used after 30 seconds from the starting of the first transport. In this example, although not used for the second transport, work entity 1 can be used in the ending of the first transport after 20 seconds from the starting of the first transport. Work entity 3 is located in charging station C without transporting a load. When the work entity is being charged in the charging station, a usable time of the work entity is a charging ending schedule time.

In this example, there is only work entity which can perform the second transport. However, when there is a plurality of work entities which can perform the second transport, the transport pattern calculation portion 16 may calculate a transport route so that, for example, the work entity of which a usable time is the earliest is used.

The transport pattern calculation portion 16 calculates a shortest route along which work entity 2 moves to a goal position PGC of load C via a position Psc of load C from the position PGB of work entity 2 at the time of ending of the first transport and sets the shortest route as a transport route of the second transport.

Transport Pattern Calculation Example 3

Transport pattern calculation example 3 will be described with reference to FIGS. 6A to 9. FIGS. 6A to 9 are diagrams illustrating calculation example 3 of all the transport patterns.

Figures 6A, 6B:
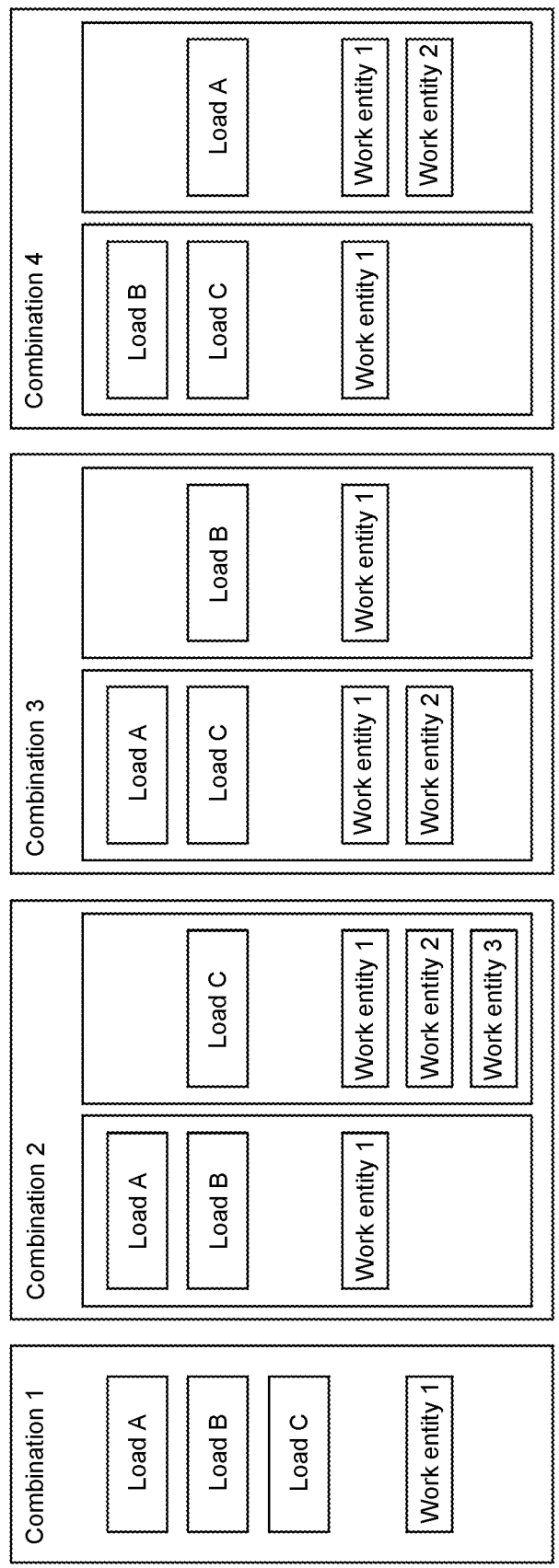
FIGS. 6A and 6B are diagrams illustrating transport pattern calculation example 3 according to the first embodiment of the disclosure.

FIG. 6A is a table illustrating weights of loads A to C and weights of loads which can be transported by work entities 1 to 3 in this example.

As illustrated in FIG. 6B, in this example, unlike examples 1 and 2 described above, one work entity can collectively transport a plurality of loads simultaneously. As illustrated in FIG. 6B, the work entity allocation portion 15 allocates all the work entities capable of performing transport to a single load or a plurality of loads with reference to information SI regarding loads which can be simultaneously transported by each work entity. For example, the work entity allocation portion 15 generates the information SI with reference to transportable weight of a target work entity and the weight of each load.

FIG. 7 illustrates transport patterns calculated by the transport pattern calculation portion 16 and the required times calculated by the required time calculation portion 18 based on combinations 1 to 4 obtained in FIG. 6B. The transport pattern calculation portion 16 calculates a plurality of transport patterns with regard to combinations 2 to 4. The required time calculation portion 18 calculates a required time of each transport pattern and selects transport pattern 3 in which the required time is the shortest.

Figure 8:
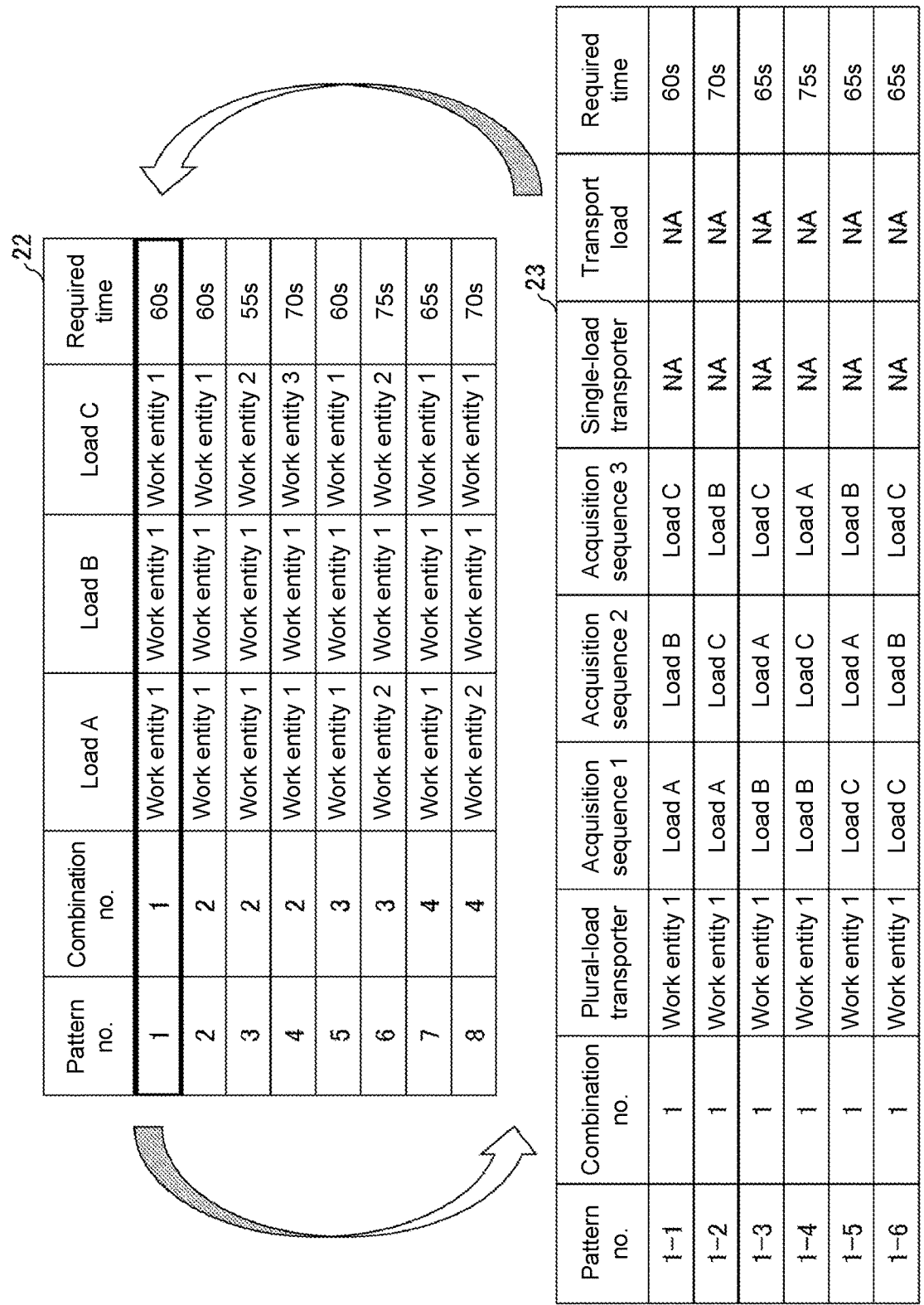
FIG. 8 is a diagram illustrating transport pattern calculation example 3 according to the first embodiment of the disclosure.
Figure 9:
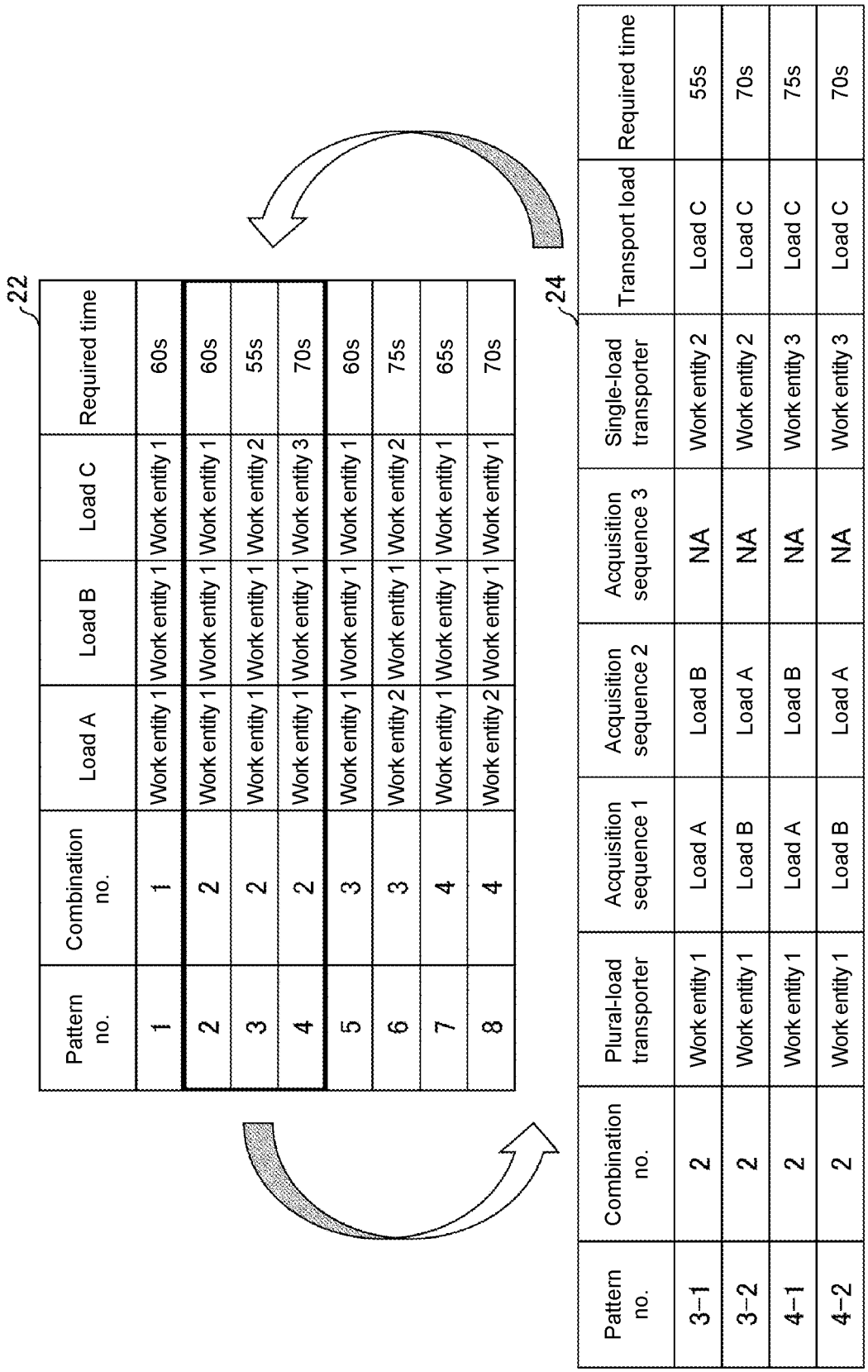
FIG. 9 is a diagram illustrating transport pattern calculation example 3 according to the first embodiment of the disclosure.

A method of calculating transport patterns will be further described in detail with reference to FIGS. 8 and 9. As illustrated in FIGS. 8 and 9, there can be a plurality of kinds of work entities transporting a plurality of loads and a plurality of sequences in which the work entities acquire the loads with regard to combinations 1 to 4.

As illustrated in Table 23 of FIG. 8, the transport pattern calculation portion 16 calculates a feasible load acquisition pattern with regard to combination 1. In combination 1, a work entity is only a work entity that can transport a plurality of loads simultaneously (in the table, referred to as a plural-load transporter). In combination 1, there is no work entity that simultaneously transports only a single load (in the table, referred to as a single-load transporter). The required time calculation portion 18 calculates the required time in each transport pattern and selects transport pattern 1-1 in which the required time is the shortest as transport pattern 1 of combination 1.

As shown in Table 24 of FIG. 9, the transport pattern calculation portion 16 calculates a plurality of transport patterns of load acquisition in combination 2. Of the transport patterns, the same transport patterns as those of Table 23 of FIG. 8 are not described in Table 24. As illustrated in Table 24, in the transport pattern of combination 2, there are work entity 1 that transports a plurality of loads and work entities 2 and 3 that transport a single load.

The required time calculation portion 18 calculates a required time in each transport pattern and selects the transport pattern in which the required time is the shortest as the transport pattern of combination 2 by a combination of work entities to be used. In this example, the required time calculation portion 18 selects transport pattern 3-1 in which the required time is shorter as an transport pattern in the case of using of work entities 1 and 2 in combination 2 between patterns 3-1 and 3-2 which are transport patterns in which work entity 1 transports loads A and B and work entity 2 transports load C. Similarly, the required time calculation portion 18 selects transport pattern 4-2 in which the required time is shorter as an transport pattern in the case of using of work entities 1 and 3 in combination 2 between patterns 4-1 and 4-2 which are transport patterns in which work entity 1 transports loads A and B and work entity 3 transports load C. Transport pattern 2 of Table 22 is a transport pattern when work entity 1 transports all the loads in combination 2 and is the same as transport pattern 1-1 in combination 1 described above.

Transport Pattern Calculation Example 4

Next, transport pattern calculation example 4 will be described. This example corresponds to a calculation example in which transport pattern calculation examples 3 and 4 described above are combined.

In this example, as in transport pattern calculation example 3, all the work entities capable of transporting loads are allocated to a single load or a plurality of loads and transport patterns are calculated in consideration of a sequence in which a work entity transporting a plurality of loads acquire the loads. Further, as in transport pattern calculation example 2 described above, the work entity allocation portion 15 allocates the work entities once and subsequently allocates the work entities again with reference the ending time and the position of the first transport of each work entity.

(Flow of Process of Determining Work Entities)

Figure 10:
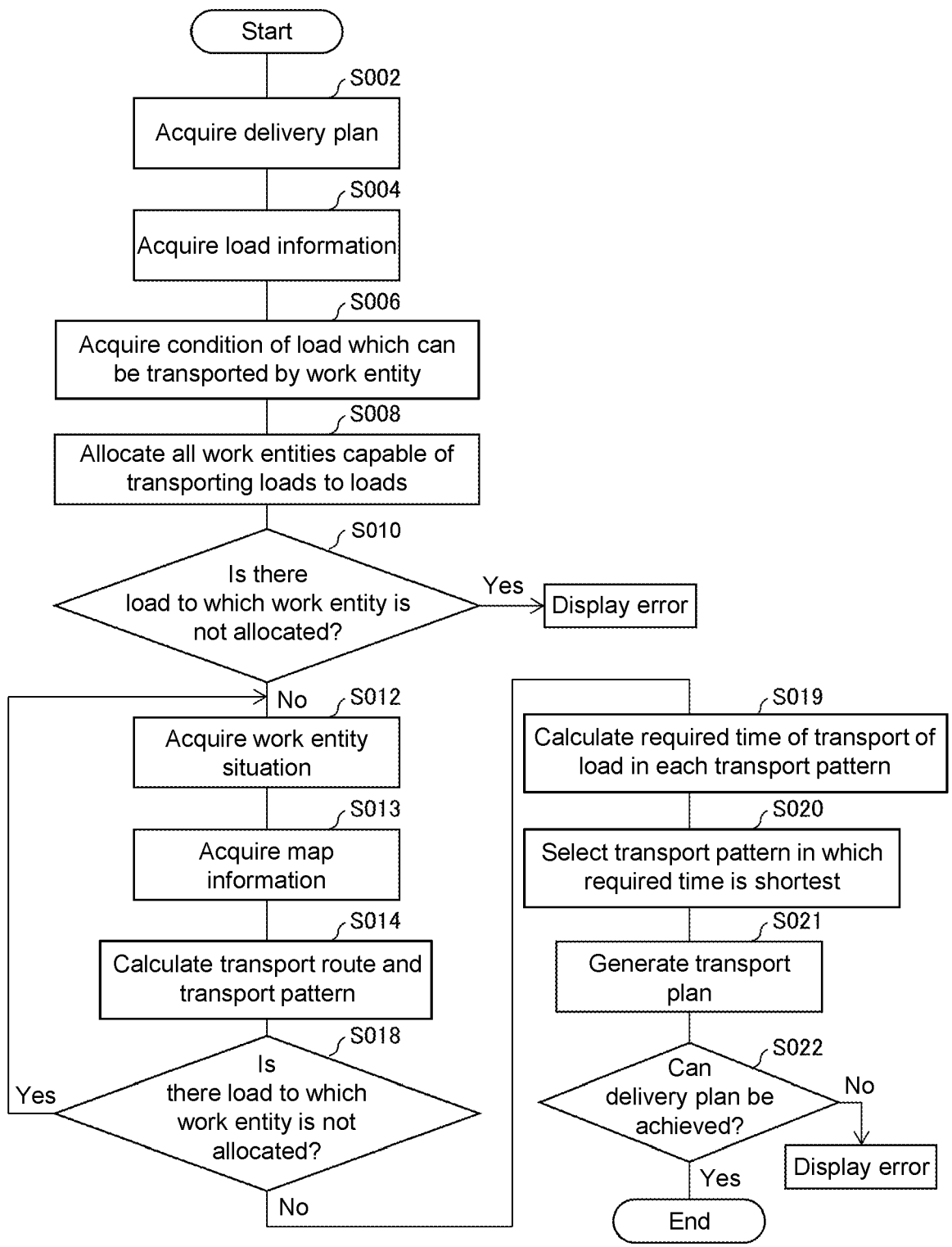
FIG. 10 is a sequence diagram illustrating a flow of a work entity determination process according to the first embodiment of the disclosure.

An example of a flow of a process of determining the work entities transporting each load will be described with reference to FIG. 10. FIG. 10 is a flowchart illustrating the flow of the process of determining the work entities. In this example, description of a process of calculating a charging route is omitted, but the embodiment is not limited thereto.

(Step S002)

First, in step S002, the delivery plan acquisition portion 3 acquires a delivery plan. The delivery plan acquisition portion 3 supplies the acquired delivery plan to the delivery plan comparison portion 19.

(Step S004)

Subsequently, in step S004, the load information acquisition portion 5 acquires the load information. The load information acquisition portion 5 supplies the acquired load information to the work entity allocation portion 15.

(Step S006)

Subsequently, in step S006, the transport capacity acquisition portion 6 acquires the transport capacity of the work entity including the condition of the load which can be transported by each work entity. The transport capacity acquisition portion 6 supplies the acquired transport capacity to the work entity allocation portion 15.

The sequence of the foregoing steps S002 to S006 is not particularly limited and their places can be switched. A place in the sequence in which step S002 is performed is not limited except that it is performed before S022.

(Step S008)

Subsequently, in step S008, the work entity allocation portion 15 allocates all the work entities capable of transporting each load to each load. A method of allocating the work entities has been described.

(Step S010)

Subsequently, in step S010, the work entity allocation portion 15 determines whether there is a load to which the work entities are not allocated. When there is a load to which the work entities are not allocated, the work entity allocation portion 15 supplies an error to the display portion (not illustrated) of the control device 30 and the display portion displays the error. When the work entities are allocated to all the loads, the work entity allocation portion 15 supplies an allocation result to the transport pattern calculation portion 16.

(Step S012)

Subsequently, in step S012, the transport pattern calculation portion 16 acquires the work entity situation from the work entity situation acquisition portion 7. In allocation after the second allocation, the work entity situation acquisition portion 7 acquires a time and positional information at a time point at which the first transport ends as a work entity situation.

(Step S013)

Subsequently, in step S013, the transport pattern calculation portion 16 acquires the map information from the map information acquisition portion 4.

A sequence in which the transport pattern calculation portion 16 performs the processes of steps S012 and S013 is not particularly limited as long as the sequence is before step S014.

(Step S014)

Subsequently, in step S014, the transport pattern calculation portion 16 calculates a transport pattern and a transport route in each transport pattern with reference to the allocation result supplied from the work entity allocation portion 15, the work entity situation supplied from the work entity situation acquisition portion 7, and the map information supplied from the map information acquisition portion 4. The details of the method of calculating the transport pattern has been described above.

(Step S018)

Subsequently, in step S018, the transport pattern calculation portion 16 determines whether there is a load to which the work entities are not allocated, in other words, the user determines whether all the loads can be transported when the work entities are allocated to each load once. When there is a load to which the work entities are not allocated, the work entity determination portion 2 allocates the work entities a plurality of times by returning the process to step S012 and repeating steps S012 to S018. When there is no load to which the work entities are not allocated, the transport pattern calculation portion 16 supplies the calculated transport pattern to the required time calculation portion 18.

(Step S019)

Subsequently, in step S019, the required time calculation portion 18 calculates a required time of transport of each load in each transport pattern with reference to the transport pattern supplied from the transport pattern calculation portion 16.

(Step S020)

Subsequently, in step S020, the required time calculation portion 18 determines the transport pattern in which the required time is the shortest. The required time calculation portion 18 supplies the determined transport pattern to the transport plan generation portion 25.

(Step S021)

Subsequently, in step S021, the transport plan generation portion 25 generates the transport plan based on the transport pattern supplied from the required time calculation portion 18. The transport plan generation portion 25 supplies the generated transport plan to the delivery plan comparison portion 19.

(Step S022)

Subsequently, in step S022, the delivery plan comparison portion 19 compares the transport plan supplied from the transport plan generation portion 25 with the delivery plan supplied from the delivery plan acquisition portion 3 to determine whether the transport plan is able to achieve the delivery plan. When the delivery plan comparison portion 19 determines that the transport plan is able to achieve the delivery plan, the process of determining the number of work entities ends. Conversely, when the delivery plan comparison portion 19 determines that the transport plan is not able to achieve the delivery plan, an error is supplied to the display portion of the control device 30 and the display portion displays the error.

CONCLUSION

According to the simulator 1 according to an aspect of the disclosure includes the transport capacity acquisition portion 6 configured to acquire a transport capacity of one kind of work entity or a plurality of kinds of work entities including a condition of a load which the work entity is able to transport; the load information acquisition portion 5 configured to acquire load information regarding each load; the map information acquisition portion 4 configured to acquire map information; the work entity situation acquisition portion 7 configured to acquire a work entity situation including positional information of each work entity; and the work entity determination portion 2 configured to determine the work entity transporting each load with reference to the transport capacity, the load information, the map information, and the work entity situation.

The simulator 1 according to the aspect of the disclosure may further include the delivery plan acquisition portion 3 configured to acquire a delivery plan. The work entity determination portion 2 may generate a transport plan with reference to a determination result regarding the work entity. Whether the transport plan is able to achieve the delivery plan may be determined with reference to the delivery plan.

In the foregoing configuration, it is possible to realize the simulator 1 capable of determining whether the delivery plan can be achieved.

The simulator 1 according to the aspect of the disclosure may further include the remaining uptime acquisition portion 8 configured to acquire a remaining uptime of the work entity; and the charging station information acquisition portion 9 configured to acquire charging station information regarding whether to charge the work entity. With reference to a remaining uptime of the work entity, the map information, and the charging station information, the work entity determination portion 2 may calculate a charging route which is a path along which the work entity is moved to a charging station.

In the foregoing configuration, it is possible to automate charging of the work entities.

In the simulator 1 according to the aspect of the disclosure, the charging station information may include the number of work entities which are able to be charged.

In the foregoing configuration, it is possible to realize the simulator 1 capable of planning charging of a work entity more efficiently.

In the simulator 1 according to the aspect of the disclosure, the work entity determination portion 2 may calculate the charging route of the work entity of which the remaining uptime is equal to or less than a constant value.

In the foregoing configuration, it is possible to realize the simulator 1 capable of planning charging of a work entity more efficiently.

In the simulator 1 according to the aspect of the disclosure, the transport capacity may include weight of a load which the one kind of work entity or the plurality of kinds of work entities is able to transport. The load information may include information regarding weight of each load.

In the foregoing configuration, it is possible to realize the simulator 1 capable of simulating transport of a load using a work entity in which the weight of a transportable load is limited.

In the simulator 1 according to the aspect of the disclosure, the work entity situation acquisition portion 7 may acquire positional information of each work entity at a time point at which transport of a certain load ends. The work entity determination portion 2 may determine the work entity transporting each load except for the certain load with reference to the positional information of each work entity at the time point at which the transport of the certain load ends.

In the foregoing configuration, it is possible to realize the simulator 1 capable of performing simulation so that one control target transports a load a plurality of times.

In the simulator 1 according to the aspect of the disclosure, the transport capacity may include information regarding which load is able to be simultaneously transported by each work entity. The work entity determination portion 2 may determine the work entity transporting each load with reference to the information regarding which load is able to be simultaneously transported by each work entity.

In the foregoing configuration, it is possible to realize the simulator 1 capable of performing simulation in consideration of the fact that one work entity simultaneously transports a plurality of loads.

In the simulator 1 according to the aspect of the disclosure, the one kind of work entity or the plurality of kinds of work entities may include an unmanned aircraft.

In the foregoing configuration, it is possible to realize the simulator 1 capable of planning transport with advantages of an unmanned aircraft.

In the simulator 1 according to the aspect of the disclosure, the one kind of work entity or the plurality of kinds of work entities may be a plurality of kinds of work entities with mutually different transport capacities.

In the foregoing configuration, it is possible to realize the simulator 1 capable of performing more efficient transport than when the plurality of kinds of work entities with mutually different transport capacities is used.

According to the control device according to another aspect of the disclosure includes the transport capacity acquisition portion 6 configured to acquire a transport capacity of one kind of work entity or a plurality of kinds of work entities including a condition of a load which the work entity is able to transport; the load information acquisition portion 5 configured to acquire load information regarding each load; the map information acquisition portion 4 configured to acquire map information; the work entity situation acquisition portion 7 configured to acquire a work entity situation including positional information of the one kind of work entity or the plurality of kinds of work entities; the work entity determination portion 2 configured to determine the work entity transporting each load with reference to the transport capacity, the load information, the map information, and the work entity situation; and the control portion configured to control the work entity with reference to a determination result regarding the work entity.

A simulation program according to still another aspect of the disclosure is a simulation program that causes a computer to function as the simulator 1 and may causes the computer to function as: the transport capacity acquisition portion 6, the load information acquisition portion 5, the map information acquisition portion 4, the work entity situation acquisition portion 7, and the work entity determination portion 2.

[Realization Example by Software]

Control blocks (in particular, the map information acquisition portion 4, the load information acquisition portion 5, the transport capacity acquisition portion 6, the work entity situation acquisition portion 7, and the work entity determination portion 2) of the simulator 1 may be realized by a logic circuit (hardware) formed by an integrated circuit (IC chip) or may be realized by software.

In the latter case, the simulator 1 includes a computer that performs a command of a program which is software realizing each function. The computer includes, for example, one or more processors and includes a computer-readable recording medium that stores the program. Then, when the computer causes the processor to read the program from the recording medium, an objective of the disclosure is implemented. As the processor, for example, a central processing unit (CPU) can be used. As the recording medium, for example, not only a "non-transistory medium" such as a read-only memory (ROM) but also a tape, a disc, a card, a semiconductor memory, a programmable logic circuit, or the like can be used. A random access memory (RAM) on which the program is loaded may be further included. The program may be supplied to the computer via any transmission medium (a communication network, a broadcast wave, or the like) capable of transmitting the program. According to a form of the disclosure can also be realized in a form of a data signal embedded in broadcast waves in which the program is embodied through electronic transmission.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A simulator comprising: a processor configured to acquire a transport capacity of one kind of work entity or a plurality of kinds of work entities including a condition of a load which the work entity is able to transport;
  acquire load information regarding each load;
  acquire map information;
  acquire a work entity situation including positional information of each work entity; determine the work entity transporting each load with reference to the transport capacity, the load information, the map information, and the work entity situation;
  acquire a remaining uptime of the work entity; acquire charging station information regarding whether to charge the work entity;
  calculate charging routes which are paths along which the work entity is moved to a charging station with reference to the remaining uptime of the work entity, the map information, and the charging station information, the work entity;
  determine a shortest charging route in which a required time for charging is shortest with reference to the charging routes;
  calculate a transport route for each transport pattern with reference to the map information, the positional information of each work entity, positional information and a transport destination of each load;
  calculate a required time for all of the loads to be transported in each transport pattern with reference to the transport route in each transport pattern and transport capacity of each work entity; and
  generate a transport plan with reference to the required time for all of the loads to be transported in each transport pattern and the charging routes,
    wherein each work entity is controlled according to the transport plan.

2. The simulator according to claim 1, the processor further configured to:
  acquire a delivery plan,
  generate the transport plan with reference to a determination result regarding the work entity, and
  wherein the processor further configured to determine whether the transport plan is able to achieve the delivery plan with reference to the delivery plan.

3. The simulator according to claim 1, wherein the charging station information includes a quantity of work entities which are able to be charged.

4. The simulator according to claim 1, wherein the processor further configured to calculate the charging routes of the work entity of which the remaining uptime is equal to or less than a constant value.

5. The simulator according to claim 1, wherein the transport capacity includes a weight of a load which the one kind of work entity or the plurality of kinds of work entities is able to transport, and
wherein the load information includes information regarding the weight of each load.

6. The simulator according to claim 1, wherein the processor further configured to acquire positional information of each work entity at a time point at which transport of a certain load ends, and
wherein the processor further configured to determine the work entity transporting each load except for the certain load with reference to the positional information of each work entity at the time point at which the transport of the certain load ends.

7. The simulator according to claim 1, wherein the transport capacity includes information regarding which load is able to be simultaneously transported by each work entity, and
wherein the processor further configured to determine the work entity transporting each load with reference to the information regarding which load is able to be simultaneously transported by each work entity.

8. The simulator according to claim 1, wherein the one kind of work entity or the plurality of kinds of work entities includes an unmanned aircraft.

9. The simulator according to claim 1, wherein the one kind of work entity or the plurality of kinds of work entities are a plurality of kinds of work entities with mutually different transport capacities.

10. The simulator according to claim 2, wherein the transport capacity includes a weight of a load which the one kind of work entity or the plurality of kinds of work entities is able to transport, and
wherein the load information includes information regarding the weight of each load.

11. The simulator according to claim 3, wherein the transport capacity includes a weight of a load which the one kind of work entity or the plurality of kinds of work entities is able to transport, and
wherein the load information includes information regarding the weight of each load.

12. The simulator according to claim 4, wherein the transport capacity includes a weight of a load which the one kind of work entity or the plurality of kinds of work entities is able to transport, and
wherein the load information includes information regarding the weight of each load.

13. The simulator according to claim 2, wherein the processor further configured to acquire positional information of each work entity at a time point at which transport of a certain load ends, and
wherein the processor further configured to determine the work entity transporting each load except for the certain load with reference to the positional information of each work entity at the time point at which the transport of the certain load ends.

14. A control device comprising:
a processor configured to
acquire a transport capacity of one kind of work entity or a plurality of kinds of work entities including a condition of a load which the work entity is able to transport;
acquire load information regarding each load;
acquire map information;
acquire a work entity situation including positional information of the one kind of work entity or the plurality of kinds of work entities;
determine the work entity transporting each load with reference to the transport capacity, the load information, the map information, and the work entity situation;
acquire a remaining uptime of the work entity;
acquire charging station information regarding whether to charge the work entity;
calculate charging routes which are paths along which the work entity is moved to a charging station with reference to the remaining uptime of the work entity, the map information, and the charging station information, the work entity determination portion;
determine a shortest charging route in which a required time for charging is shortest with reference to the charging routes;
calculate a transport route for each transport pattern with reference to the map information, the positional information of each work entity, positional information and a transport destination of each load; and
calculate a required time of load transport in each transport pattern with reference to the transport route in each transport pattern and transport capacity of each work entity;
calculate a required time for all of the loads to be transported in each transport pattern with reference to the transport route in each transport pattern and transport capacity of each work entity;
generate a transport plan with reference to the required time for all of the loads to be transported in each transport pattern and the charging routes; and
control the work entity with reference to a determination result regarding the work entity.

15. A non-transitory computer-readable recording medium comprising a simulation program causing a processor to
acquire a transport capacity of one kind of work entity or a plurality of kinds of work entities including a condition of a load which the work entity is able to transport;
acquire load information regarding each load;
acquire map information;
acquire a work entity situation including positional information of each work entity; and
determine the work entity transporting each load with reference to the transport capacity, the load information, the map information, and the work entity situation;
acquire a remaining uptime of the work entity; acquire charging station information regarding whether to charge the work entity;
calculate charging routes which are paths along which the work entity is moved to a charging station with reference to the remaining uptime of the work entity, the map information, and the charging station information, the work entity determination portion;

determine a shortest charging route in which a required time for charging is shortest with reference to the charging routes;

calculate a transport route for each transport pattern with reference to the map information, the positional information of each work entity, positional information and a transport destination of each load;

calculate a required time for all of the loads to be transported in each transport pattern with reference to the transport route in each transport pattern and transport capacity of each work entity; and generate a transport plan with reference to the required time for all of the loads to be transported in each transport pattern and the charging routes, wherein each work entity is controlled according to the transport plan.

\* \* \* \* \*